June 8, 1926.  
E. N. FALES  
1,588,178  
INSTRUMENT FOR INDICATING BOTH AIR SPEED AND ANGLE OF INCIDENCE OF AN AEROFOIL  
Filed March 9, 1922
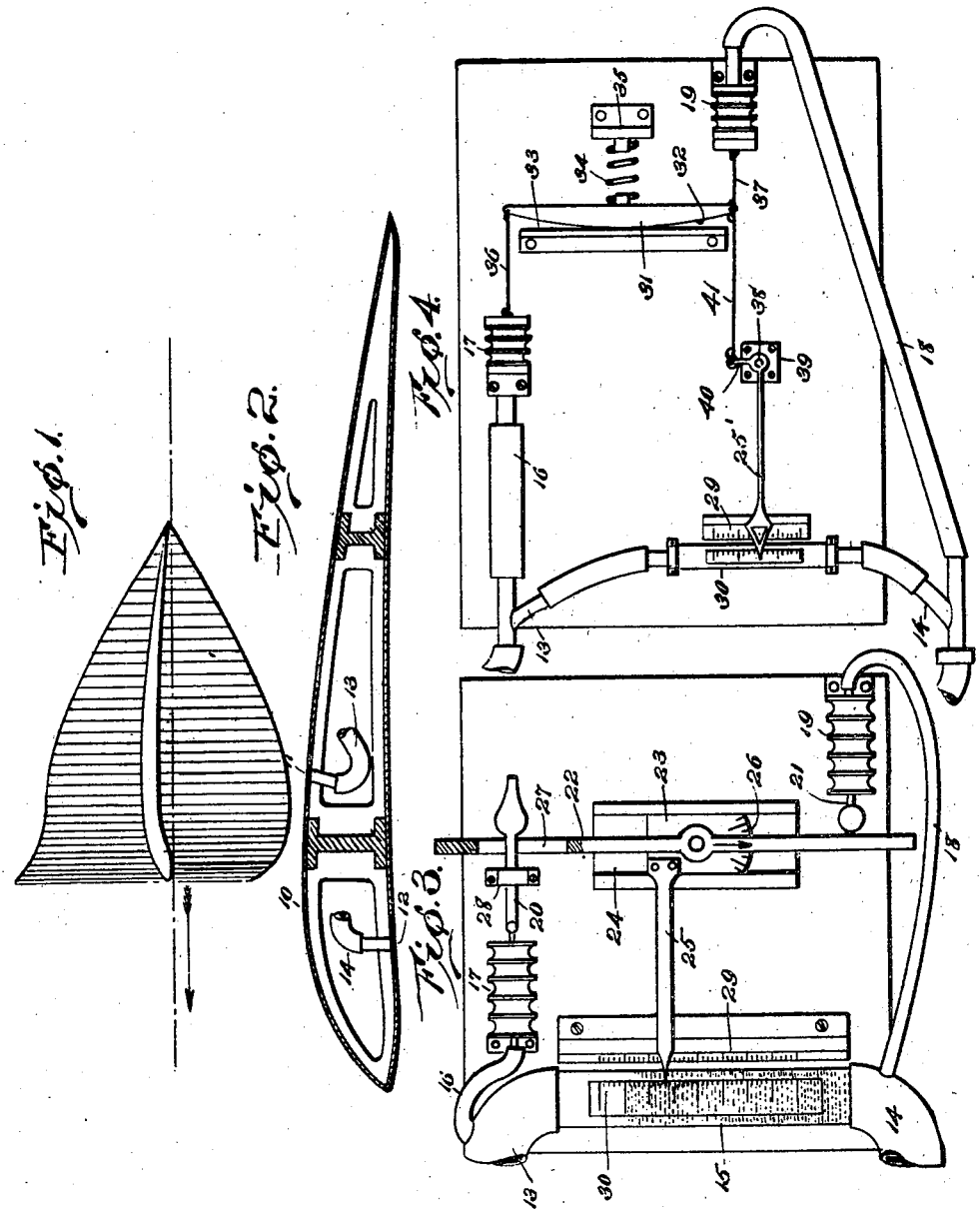

Patented June 8, 1926.

1,588,178

UNITED STATES PATENT OFFICE.

ELISHA N. FALES, OF LAKE FOREST, ILLINOIS.

INSTRUMENT FOR INDICATING BOTH AIR SPEED AND ANGLE OF INCIDENCE OF AN AEROFOIL.

Application filed March 9, 1922. Serial No. 542,424.

The pressure distributions on the upper and lower surfaces of an aerofoil retain their proportion at all velocities but change in intensity provided the angle of incidence remains constant. However, when the angle of incidence changes both the proportion and intensity of these pressures vary. The primary object of my invention is to provide an instrument capable of indicating the degree of change of intensity of these pressures thus establishing a measure for air speed and angle of incidence of the wings. This primary aim and other objects of the invention whereby an instrument of simple construction and accurate operation is obtained, will become apparent as the description proceeds.

The invention is described in connection with the accompanying drawings, in which:

Figure 1 is a pressure diagram for the upper and lower surfaces of an aerofoil;

Figure 2 is a sectional view of part of a wing, showing tubes communicating with the upper and lower surfaces thereof;

Figure 3 is a partial sectional and front view of the indicating mechanism; and

Figure 4 is a diagrammatic view of the assembled mechanism of a modified form of the invention employing means for automatically moving the pointer.

Like numerals of reference designate corresponding parts throughout the several views of the drawing.

A wing 10 is provided with apertures 11, 12 in the upper and lower surfaces thereof. Tubes 13, 14 are connected respectively with said apertures and communicate with the upper and lower liquid surfaces of a manometer column 15. The column 15 illustrated is preferably one leg of a V-tube manometer. Tube 13 is also connected with a sylphon 17 by means of a branch pipe 16 and the tube 14 is in like manner connected to a sylphon 19 by a branch pipe 18. The sylphon 17 being connected to the upper surface of the wing will have suction produced therein while the sylphon 19 communicating with the lower surface of the wing is subjected to fluid compression.

Rods 20 and 21 are attached respectively to the movable heads of the sylphons 17, 19 and each of these rods is provided with an enlarged end which bears against a lever 22, centrally pivoted on a plate 23. The latter is slidably adjustable in the guideways of a base 24 and carries a pointer 25 fixed thereto. The lower edge of the plate is graduated as indicated at 26 and the lever 22 carries an index mark adapted to cooperate with said graduations to indicate the angular position of said lever. The rods 20 and 21 act on the lever 22 near opposite ends but on the same side of the lever, so that the forces exerted by them tend to neutralize each other. The rod 20 passes through an elongated slot 27 in the lever in order to permit sliding movements of the latter, and a clip 28 holds the rod against sliding movements with the lever although permitting the rod to move in response to the swinging of the lever about its pivot. The pointer 25 overlies a fixed scale 29 and also a movable scale 30 which floats in the liquid within the manometer tube.

The lever 22 when once in equilibrium with regard to the moments exerted by the pressures at either end, will retain its equilibrium at all speeds of flight provided the angle of incidence is the same, because the pressures at 11 and 12 are proportional to the square of the velocity. Under this condition any change of height in the manometer column 15 will move the scale 30 with respect to the pointer and thereby indicate a change of speed. In case the angle of incidence changes, a new relation will exist between the pressures at 11 and 12 and consequently there may be a further change in the height of the manometer column, and the lever 22 moves simultaneously about its pivot. The extent of movement of the lever is indicated by the graduations 26 and in order to bring the lever back to initial position the operator slides the plate 23 in its guideways until the turning moments are equalized, then the lever is in its initial or zero position. The pointer 25 now has a new position in relation to the fixed scale 29 which will then indicate the degree of the change of the angle of incidence and floating scale 30 indicates the rate of speed. The readings of the pointer on these scales give data from which both the angle of incidence and velocity may be determined, after suitable calibration.

In order that the operator may be relieved from moving the pointer and slidable plate, as above described, means are provided in the modification of my invention illustrated in Fig. 4, for automatically accomplishing the same result. A bar 31 is provided with a surface 32 in the form of an arc of large radius which is adapted to rock on a flat surface 33 of a fixed angle plate. The arcuate surface 32 is maintained in operative engagement with the surface 33 by a spring 34 compressed between the bar 31 and an abutment 35. Rods 36, 37 respectively connect the movable heads of the sylphons to opposite ends of the rocking bar 31. For this purpose the outer ends of the rods are hook-shaped and engage in apertures formed near the ends of the bar. The pointer 25' forms one arm of a bell crank lever pivoted on a pin 38 projecting from a fixed plate 39. The other arm 40 of the bell crank is connected to the bar 31 at the aperture receiving the rod 37, by means of a rod 41.

When the angle of incidence of the wing is changed the relation between the pressures in sylphons 17 and 19 is changed resulting in a rocking movement of the bar 31 which automatically changes the position of the fulcrum. The movements of the bar 31 are communicated to the pointer through the rod 41. The pointer is moved in relation to fixed scale 29 and floating scale 30 the readings of which, after proper calibration enable the observer to determine both velocity and angle of incidence. It will be noted that the pressures acting on the manometer column are cumulative while those acting on the lever and bar tend to oppose each other and may be described as differential.

It will be understood that the particular constructions described and shown have been chosen for illustrative purposes merely and that the invention as defined by the claims hereunto appended, may be otherwise embodied and applied without departing from the spirit and scope thereof.

I claim:

1. An instrument of the class described for airplanes comprising, an air speed indicating device, mechanism for indicating changes in the angle of incidence of a wing of the airplane, and means operatively connecting said mechanism to said device in such a manner as to affect the indications thereof in accordance with movement of said mechanism.

2. An instrument of the class described for airplanes comprising, an air speed indicating device including an index means, mechanism for indicating changes in the angle of incidence of a wing of the airplane, and means for moving the index means of the indicating device upon movement of said mechanism.

3. An instrument of the class described for airplanes comprising an air speed indicating device, means for communicating the cumulative effect of pressures above and below a wing of the airplane to said indicating device, mechanism for indicating changes in the angle of incidence of the wing, means for communicating the differential effect of pressures above and below a wing of the airplane to said mechanism, and a pointer for said air speed indicating device, in connection with said mechanism to control the position of said pointer.

4. An instrument of the class described for airplanes comprising, an air speed indicating device, and mechanism for indicating changes in the angle of incidence of a wing of the airplane consisting of a movable bar, pressure responsive devices adapted to actuate said bar, means for communicating the pressures above and below the wing respectively to said pressure responsive devices, and a pointer associated with said indicating device the position of which is determined by the movement of said bar.

5. An instrument of the class described for airplanes comprising, an air speed indicating device having fixed and movable scales associated therewith, a pointer for said scales, and mechanism for indicating changes in the angle of incidence of a wing of the airplane in connection with said pointer adapted to determine the position of said pointer.

6. An instrument of the class described for airplanes comprising, a manometer tube, means for subjecting the manometer column therein to the cumulative effect of pressures above and below a wing of the airplane, a floating scale within the manometer tube, a fixed scale, a pointer for said scales, and mechanism for indicating changes in the angle of incidence of the wing, in connection with said pointer to control the position of said pointer.

In testimony whereof I affix my signature.

ELISHA N. FALES.